United States Patent
Fujita

(10) Patent No.: US 11,652,341 B2
(45) Date of Patent: May 16, 2023

(54) BUS BAR AND BATTERY STACK

(71) Applicant: Panasonic Intellectual Property Management Co., Ltd., Osaka (JP)

(72) Inventor: Goro Fujita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 581 days.

(21) Appl. No.: 16/622,235

(22) PCT Filed: Jun. 14, 2018

(86) PCT No.: PCT/JP2018/022657
§ 371 (c)(1),
(2) Date: Dec. 12, 2019

(87) PCT Pub. No.: WO2019/003928
PCT Pub. Date: Jan. 3, 2019

(65) Prior Publication Data
US 2020/0106073 A1    Apr. 2, 2020

(30) Foreign Application Priority Data

Jun. 27, 2017   (JP) .............................. JP2017-125525

(51) Int. Cl.
*H02G 5/00* (2006.01)
*H01M 50/209* (2021.01)
(Continued)

(52) U.S. Cl.
CPC .......... *H02G 5/002* (2013.01); *H01M 50/209* (2021.01); *H01M 50/505* (2021.01);
(Continued)

(58) Field of Classification Search
CPC ........... H01M 10/0413; H01M 10/625; H01M 10/647; H01M 10/6553; H01M 10/659;
(Continued)

(56) References Cited

U.S. PATENT DOCUMENTS

2005/0070164 A1\* 3/2005 Mita ................... H01M 50/502
439/627
2011/0206948 A1  8/2011 Asai et al.
(Continued)

FOREIGN PATENT DOCUMENTS

CN        106169554 A    11/2016
JP     2007073266 A  \*  3/2007  ............ H01M 10/30
(Continued)

OTHER PUBLICATIONS

International Search Report of PCT application No. PCT/JP2018/022657 dated Sep. 4, 2018.
(Continued)

*Primary Examiner* — Timothy J Thompson
*Assistant Examiner* — Guillermo J Egoavil
(74) *Attorney, Agent, or Firm* — McDermott Will & Emery LLP

(57) ABSTRACT

A bus bar includes a first joint that is joined to an output terminal of a first battery, a second joint that is joined to an output terminal of a second battery, a heat absorber that is disposed between the first joint and the second joint and has a heat capacity larger than heat capacities of the first joint and the second joint, and a displacement absorber that is disposed between the first joint and the second joint and deforms in response to a relative displacement of the first battery and the second battery.

10 Claims, 8 Drawing Sheets

(51) Int. Cl.
*H01M 50/522* (2021.01)
*H01M 50/505* (2021.01)
*H01M 50/51* (2021.01)
*H01M 50/264* (2021.01)
*H01M 50/296* (2021.01)
*H01M 50/224* (2021.01)

(52) U.S. Cl.
CPC ......... *H01M 50/51* (2021.01); *H01M 50/522* (2021.01); *H01M 50/224* (2021.01); *H01M 50/264* (2021.01); *H01M 50/296* (2021.01)

(58) Field of Classification Search
CPC .. H01M 50/20; H01M 50/502; H01M 50/209; H01M 50/224; H01M 50/264; H01M 50/296; H01M 50/505; H01M 50/51; H01M 50/522; H01M 50/249; H01M 50/507; H01M 50/514; H01M 50/55; H01M 50/553; H01R 11/01; H01R 11/288; H02G 5/002; H02G 5/00; Y02E 60/10
USPC .................................................. 439/158, 121
See application file for complete search history.

(56) References Cited

U.S. PATENT DOCUMENTS

| | | | |
|---|---|---|---|
| 2015/0140393 A1* | 5/2015 | Yamamoto | H01M 50/514 |
| | | | 429/121 |
| 2016/0344011 A1 | 11/2016 | Ogawa et al. | |
| 2017/0005313 A1* | 1/2017 | Ogawa | H01M 50/502 |
| 2019/0288264 A1* | 9/2019 | Fujita | H01M 50/516 |

FOREIGN PATENT DOCUMENTS

| | | | | |
|---|---|---|---|---|
| JP | 2011-175743 | 9/2011 | | |
| JP | 2015-198070 | 11/2015 | | |
| JP | 2016-219270 | 12/2016 | | |
| JP | 2017-016856 | 1/2017 | | |
| JP | 2017195056 A | * 10/2017 | ............. | H01G 11/10 |
| WO | 2017/208804 | 12/2017 | | |

OTHER PUBLICATIONS

English Translation of Chinese Office Action dated Dec. 9, 2021 for the related Chinese Patent Application No. 201880038462.9.

* cited by examiner

BUS BAR AND BATTERY STACK

TECHNICAL FIELD

The present invention relates to a bus bar and a battery stack.

BACKGROUND ART

For example, for a vehicle and the like, a battery stack formed by connecting a plurality of batteries in series is known as a battery used for a power source that requires high output voltage. Conventionally, in such a battery stack, output terminals of adjacent batteries connect to each other via a bus bar (for example, see PTL 1).

CITATION LIST

Patent Literature

PTL 1: Unexamined Japanese Patent Publication No. 2011-175743

SUMMARY OF THE INVENTION

An earnest investigation of the conventional battery stacks conducted by the inventor of the present invention has resulted in the recognition of following problems. That is, two batteries connected to each other via a bus bar may relatively displace due to battery expansion or the like. In order to maintain a stable electrical connection between the two batteries, measures against such a displacement are desired. Also, temperature rise of a battery tends to deteriorate power generation performance. Thus, measures against the temperature rise of the battery are also desirable.

The present invention has been accomplished in light of this situation. An object of the present invention is to provide a technique for maintaining a stable electrical connection between batteries and inhibiting deterioration in power generation performance of the battery.

An aspect of the present invention is a bus bar. The bus bar includes a first joint that is joined to an output terminal of a first battery, a second joint that is joined to an output terminal of a second battery adjacent to the first battery, a heat absorber that is disposed between the first joint and the second joint and has a heat capacity larger than heat capacities of the first joint and the second joint, and a displacement absorber that is disposed between the first joint and the second joint and deforms in response to a relative displacement of the first battery and the second battery.

Another aspect of the present invention is a battery stack. The battery stack includes the bus bar in the above aspect, and a plurality of batteries that are electrically connected to each other via the bus bar.

Any combination of the above-described configuration elements and converted expressions of the present invention in methods, apparatuses, systems, and the like are still effective as aspects of the present invention.

The present invention makes it possible to maintain a stable electrical connection between batteries and to inhibit deterioration in power generation performance of the battery.

DESCRIPTION OF EMBODIMENT

Figure 1:
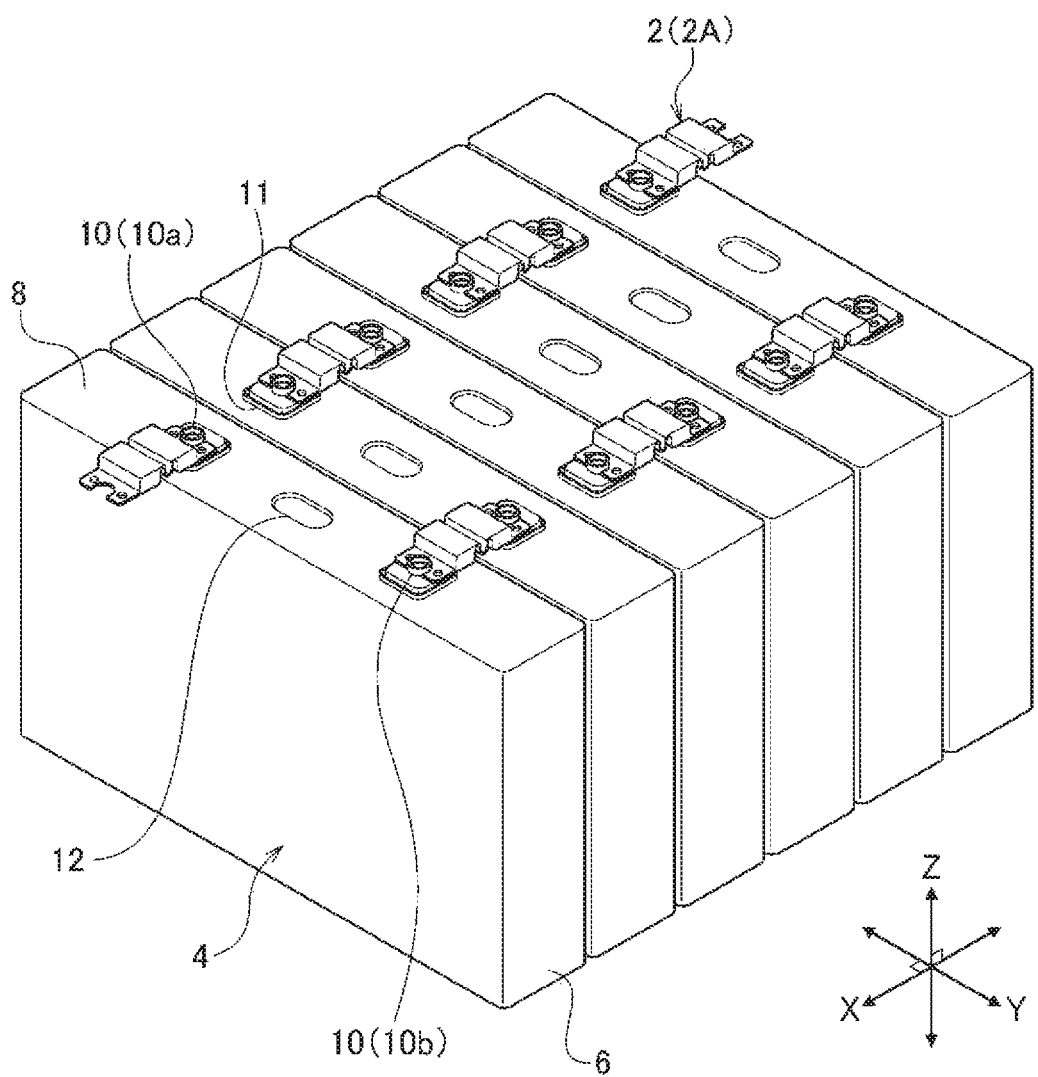
FIG. 1 is a perspective view illustrating a schematic structure of a battery stack including a bus bar according to an exemplary embodiment.

Hereinafter, the present invention will be described based on a preferred exemplary embodiment with reference to the drawings. The exemplary embodiment is an exemplification and does not limit the invention. All features described in the exemplary embodiment and combinations of the features are not necessarily essential to the invention. The same reference marks are assigned to the same or equivalent configuration elements, members, and processes illustrated in the drawings. Explanation for the same or equivalent components, members, and processes will not be repeated as appropriate. For convenience, scales or shapes of parts illustrated in the drawings are determined to facilitate explanation. The scales or shapes of parts should not be interpreted as limitation unless otherwise mentioned. Further, terms "first", "second", and the like, when used in the present description and claims, do not mean any order or importance unless otherwise mentioned, but are intended to distinguish between one configuration and another configuration.

Figure 2:
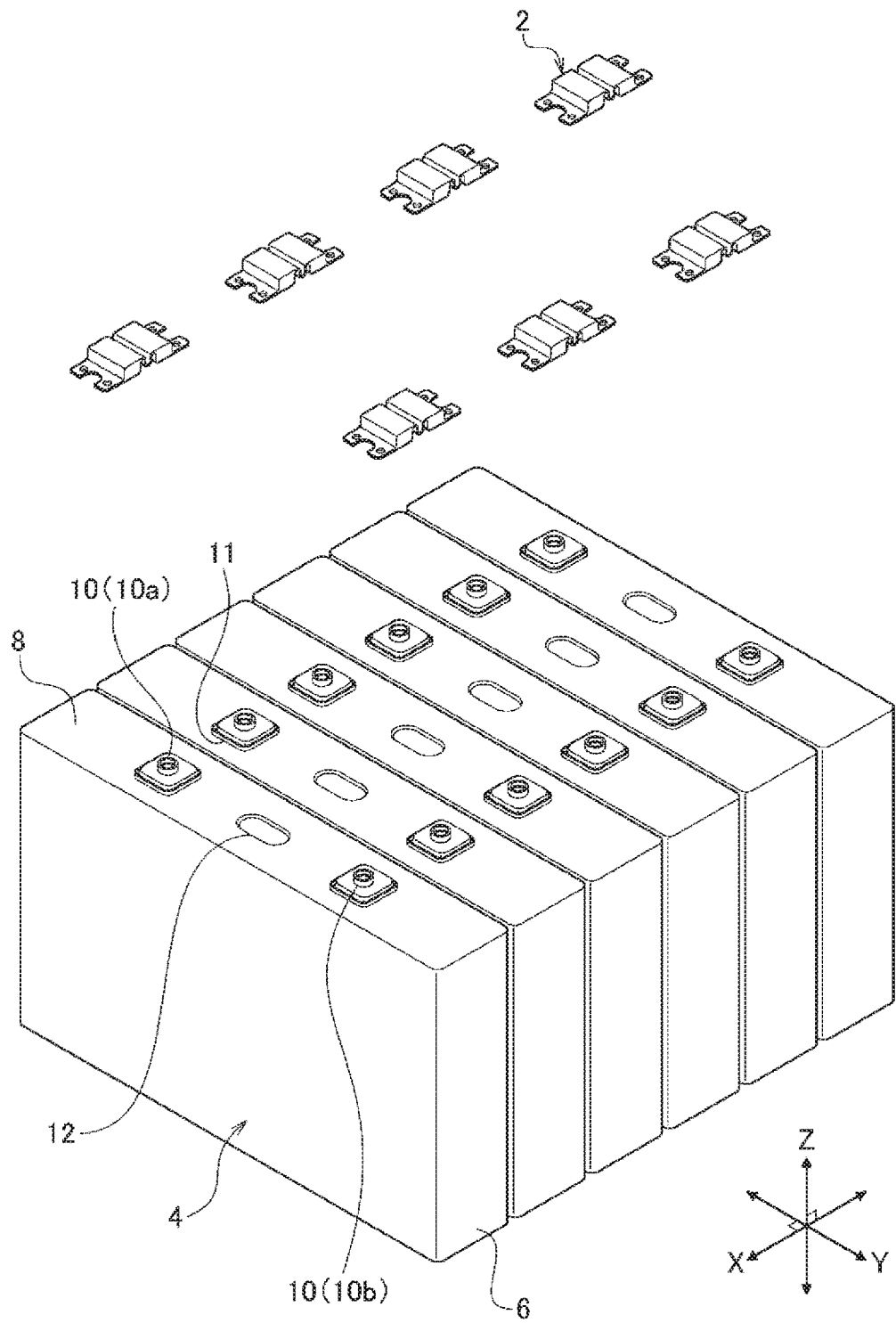
FIG. 2 is an exploded perspective view of the battery stack.

FIG. 1 is a perspective view illustrating a schematic structure of a battery stack including a bus bar according to an exemplary embodiment. FIG. 2 is an exploded perspective view of the battery stack. Note that illustration of a separator is omitted in FIGS. 1 and 2. Battery stack 1 includes bus bar 2 (2A) and a plurality of batteries 4 that are electrically connected to each other via bus bar 2. In the present exemplary embodiment, for example, six batteries 4 are connected in series via bus bars 2 to form battery stack 1.

For example, each battery 4 is a rechargeable secondary battery, such as a lithium-ion battery, a nickel-hydrogen battery, or a nickel-cadmium battery. Battery 4 is a so-called prismatic battery, and has exterior can 6 with a flat rectangular parallelepiped shape. Exterior can 6 has a substantially rectangular opening (not illustrated) provided on one surface of exterior can 6. An electrode assembly, an electrolyte, and the like are put into exterior can 6 through this opening. The opening of exterior can 6 is provided with sealing plate 8 that seals exterior can 6.

There are output terminal 10 of a positive electrode near one end of sealing plate 8 in a longitudinal direction, and output terminal 10 of a negative electrode near the other end of sealing plate 8. Hereinafter, output terminal 10 of a positive electrode is referred to as positive-electrode terminal 10a, and output terminal 10 of a negative electrode is referred to as negative-electrode terminal 10b, as appropriate. When there is no need to distinguish polarities of output terminals 10, positive-electrode terminal 10a and negative-electrode terminal 10b are collectively referred to as output terminals 10. Output terminal 10 protrudes from an opening of sealing plate 8.

Gasket 11 as a seal member is disposed between a periphery of output terminal 10 and the opening of sealing plate 8. Gasket 11 airtightly closes a boundary between sealing plate 8 and output terminal 10. Gasket 11 prevents a short circuit between sealing plate 8 and output terminal 10. Exterior can 6, sealing plate 8, and output terminal 10 are electric conductors and are made of metal, for example. Gasket 11 is an insulator and is made of resin, for example.

In the present exemplary embodiment, assume that a side on which sealing plate 8 is provided serves as a top surface of battery 4, and the opposite side serves as a bottom surface of battery 4. Further, battery 4 has two main surfaces connecting the top surface to the bottom surface. This main surface has a largest area among six surfaces of battery 4. Two surfaces other than the top surface, the bottom surface, and the two main surfaces serve as side surfaces of battery 4. A top-surface side of battery 4 serves as a top surface of battery stack 1, and a bottom-surface side of battery 4 serves as a bottom surface of battery stack 1. For convenience, assume that a top-surface side of battery stack 1 indicates a vertically upward direction, and a bottom-surface side of battery stack 1 indicates a vertically downward direction.

In sealing plate 8, safety valve 12 is disposed between a pair of output terminals 10. Safety valve 12 can open to release internal gas when pressure in exterior can 6 rises to be higher than or equal to a predetermined value. Safety valve 12 of each battery 4 connects to a gas duct (not illustrated). Exhaust gas from safety valve 12 is exhausted to the gas duct.

A plurality of batteries 4 are stacked at predetermined intervals with the main surfaces of adjacent batteries 4 facing each other. The term "stack" means an arrangement of a plurality of members in any one direction. Therefore, stacking batteries 4 includes arranging a plurality of batteries 4 in a horizontal direction. Further, each battery 4 is disposed such that output terminal 10 faces in an identical direction (for convenience herein, vertically upward direction). Two adjacent batteries 4 are stacked such that positive-electrode terminal 10a of one of batteries 4 is adjacent to negative-electrode terminal 10b of the other of batteries 4. Positive-electrode terminal 10a and negative-electrode terminal 10b are electrically connected to each other via bus bar 2. Output terminals 10 of the same polarity of two adjacent batteries 4 may be connected to each other via bus bar 2

Bus bar 2 is a roughly strip-shaped metal member. One end side of bus bar 2 electrically connects to positive-electrode terminal 10a of one of batteries 4. The other end side of bus bar 2 electrically connects to negative-electrode terminal 10b of the other of batteries 4. Structure of bus bar 2 will be described in detail later.

Battery stack 1 has a plurality of separators (not illustrated). The separator is also called an insulating spacer, and is made of resin having an insulation property, for example. The separator is disposed between batteries 4, and between battery 4 and an end plate described below. This separator insulates exterior cans 6 of adjacent batteries 4 from each other. This separator also insulates exterior can 6 of battery 4 from the end plate.

Battery stack 1 is sandwiched between a pair of end plates (not illustrated). Each end plate is disposed so as to be adjacent to outermost battery 4. The end plate is made of a metal sheet, for example. An external connection terminal (not illustrated) is attached to the end plate via an insulation member. The external connection terminal of the end plate and outermost battery 4 are electrically connected to each other via bus bar 2. For example, one end side of bus bar 2 electrically connects to output terminal 10 that is a termination of the series connection of batteries 4. The other end side of bus bar 2 electrically connects to the external connection terminal of the end plate. The external connection terminal connects to an external load via a wire leading to the outside of battery stack 1.

Battery stack 1 and the pair of end plates are restrained by a pair of restraint members (not illustrated). The pair of restraint members are also called bind bars. The pair of restraint members are arrayed in horizontal direction Y perpendicular to stacking direction X of the plurality of batteries 4. Each restraint member has a first part extending in stacking direction X of batteries 4 and two second parts protruding from both ends of the first part to a battery stack 1 side. The two second parts face each other in stacking direction X. The restraint member can be formed by folding ends of a metal sheet, for example.

The two second parts and the pair of end plates are fixed with screws or the like, which makes the pair of end plates and the pair of restraint members bind the plurality of batteries 4 and the plurality of separators. The separator, the end plate, and the restraint member have publicly known structure, and thus more detailed description will be omitted.

Figure 3:
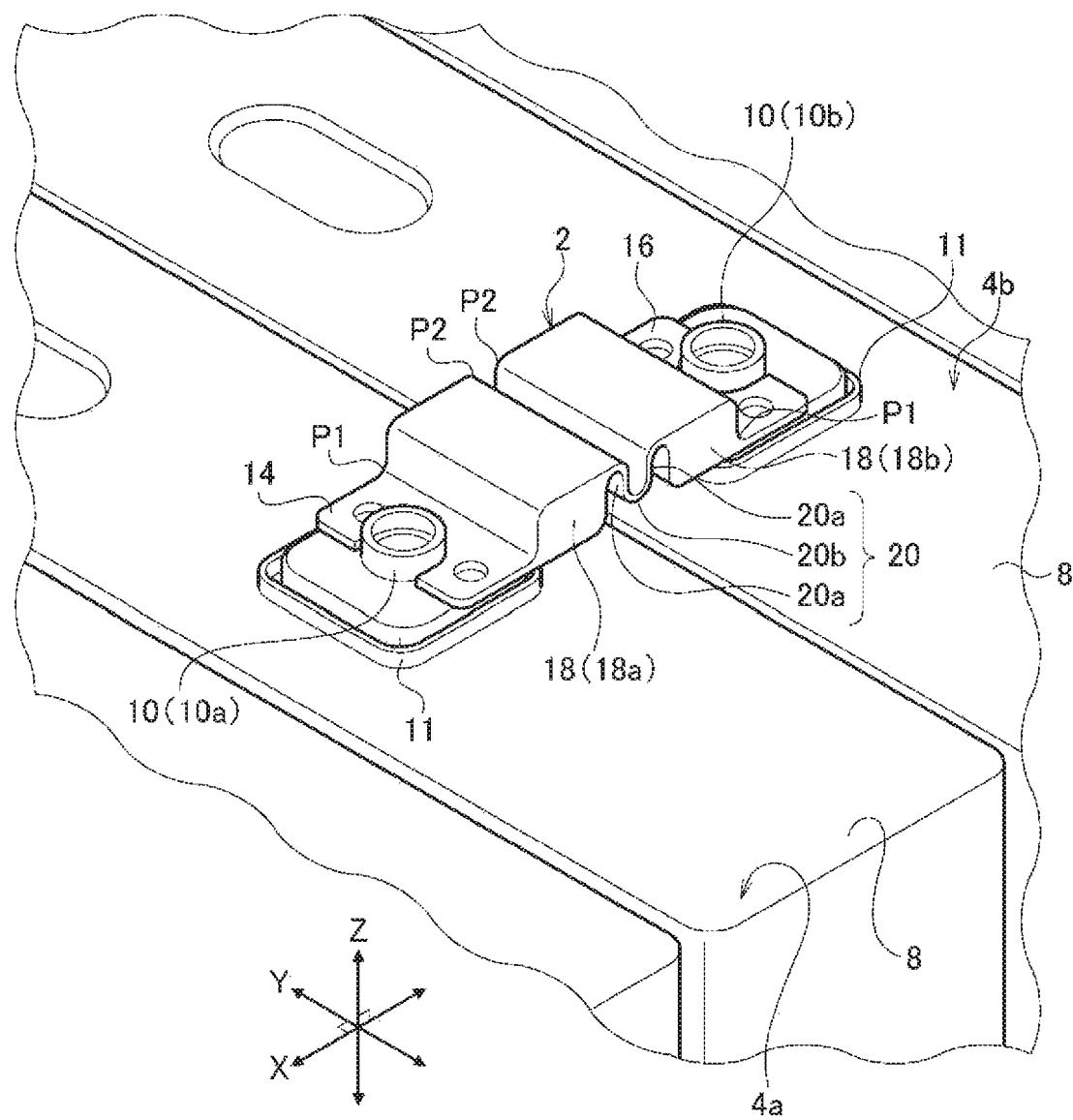
FIG. 3 is a perspective view illustrating an enlarged region including the bus bar of the battery stack.
Figure 4:
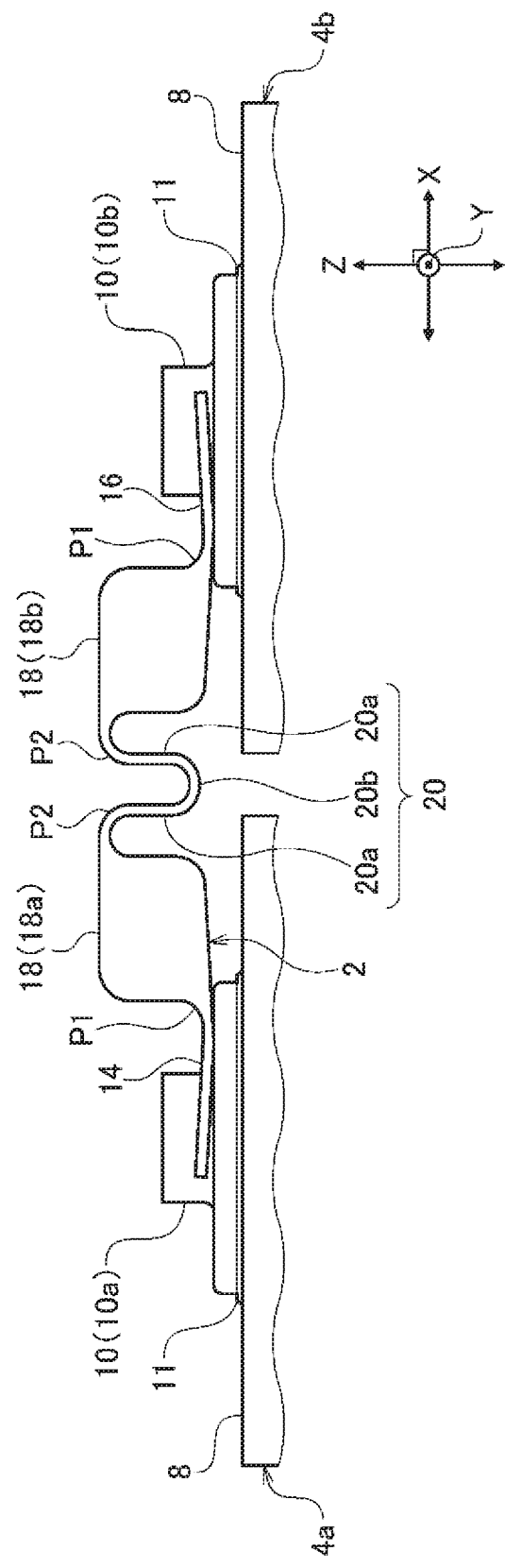
FIG. 4 is a side view illustrating an enlarged region including the bus bar of the battery stack.

Subsequently, bus bar 2 according to the present exemplary embodiment will be described in detail. FIG. 3 is a perspective view illustrating an enlarged region including the bus bar of the battery stack. FIG. 4 is a side view illustrating an enlarged region including the bus bar of the battery stack. FIGS. 3 and 4 illustrate a region where first battery 4a and second battery 4b that are adjacent batteries 4 out of battery stack 1 are connected to each other via bus bar 2. Illustration of the separator is omitted in FIGS. 3 and 4. FIG. 4 illustrates simplified gasket 11.

Bus bar 2 includes first joint 14, second joint 16, heat absorber 18, and displacement absorber 20. In the present exemplary embodiment, first joint 14, second joint 16, heat absorber 18, and displacement absorber 20 are configured with a single inseparable member.

First joint 14 is joined to output terminal 10 of first battery 4a. Second joint 16 is joined to output terminal 10 of second battery 4b adjacent to first battery 4a. First joint 14 and second joint 16 are plate-shaped, and extend substantially parallel to sealing plates 8 of first battery 4a and second battery 4b. First joint 14 and second joint 16 are joined to output terminals 10 by welding, for example. Accordingly, first joint 14 and second joint 16 have cross-section areas that can realize an allowable current required for bus bar 2. Meanwhile, first joint 14 and second joint 16 are designed so as not to become too thick in order to avoid difficulty in welding.

Heat absorber 18 is disposed between first joint 14 and second joint 16. Heat absorber 18 is a part having a heat capacity larger than heat capacities of first joint 14 and second joint 16. Heat generated by a current flow in bus bar 2 accumulates mainly in heat absorber 18 and discharges from heat absorber 18 to the outside. Heat absorber 18 connects to output terminal 10 via first joint 14 and second joint 16. That is, there is no direct contact between heat absorber 18 and output terminal 10. Heat absorber 18 is separated from sealing plate 8 of battery 4. That is, there is no contact between heat absorber 18 and battery 4.

Heat absorber 18 has a thick part that is thicker than thicknesses of first joint 14 and second joint 16. Whole heat absorber 18 of the present exemplary embodiment is configured with the thick part. That is, heat absorber 18 is larger in size in vertical direction Z perpendicular to stacking direction X of batteries 4, that is, in a normal direction of sealing plate 8 than first joint 14 and second joint 16 in the same direction.

Heat absorber 18 of the present exemplary embodiment includes first heat absorber 18a and second heat absorber 18b. First heat absorber 18a and second heat absorber 18b are both configured with a thick part. First heat absorber 18a connects to first joint 14. Second heat absorber 18b connects to second joint 16. First heat absorber 18a and second heat absorber 18b are substantially rectangular-shaped as viewed from horizontal direction Y. First heat absorber 18a and second heat absorber 18b have a lower side that extends parallel to sealing plate 8 and is close to sealing plate 8, and an upper side that extends parallel to sealing plate 8 and is distant from sealing plate 8.

Displacement absorber 20 is disposed between first joint 14 and second joint 16. Displacement absorber 20 is a part that deforms in response to a relative displacement of first battery 4a and second battery 4b. That is, bus bar 2 is flexible in displacement absorber 20. Elastic deformation of displacement absorber 20 absorbs the relative displacement of first battery 4a and second battery 4b. At least a part of displacement absorber 20 extends in a direction intersecting stacking direction X of first battery 4a and second battery 4b as viewed from horizontal direction Y, that is, in a direction approaching to and separating from sealing plates 8 of batteries 4. This can especially absorb a displacement in stacking direction X.

Displacement absorber 20 of the present exemplary embodiment has two first parts 20a that extend in vertical direction Z, and second part 20b that is curve-shaped and couples ends of two first parts 20a to each other. Displacement absorber 20 is thus U-shaped.

Displacement absorber 20 has a cross-section area that can realize an allowable current required for bus bar 2. Meanwhile, displacement absorber 20 is designed so as not to become too thick in order to be deformable in response to the relative displacement of first battery 4a and second battery 4b. For example, displacement absorber 20 is smaller in thickness than heat absorber 18 and is nearly equal in thickness to first joint 14 and second joint 16.

Displacement absorber 20 is disposed between first heat absorber 18a and second heat absorber 18b. Two first parts 20a are arrayed in an aligning direction of first heat absorber 18a and second heat absorber 18b. First part 20a that is near first heat absorber 18a is coupled to first heat absorber 18a at an end of first part 20a, the end being opposite to the end coupled to second part 20b. First part 20a that is near second heat absorber 18b is coupled to second heat absorber 18b at an end of first part 20a, the end being opposite to the end coupled to second part 20b.

Accordingly, first heat absorber 18a is coupled to first joint 14 at one end side of first heat absorber 18a in stacking direction X of first battery 4a and second battery 4b (a side near first battery 4a). First heat absorber 18a is coupled to displacement absorber 20 at another end side of first heat absorber 18a in stacking direction X (a side near second battery 4b). Second heat absorber 18b is coupled to second joint 16 at one end side of second heat absorber 18b in stacking direction X (a side near second battery 4b). Second heat absorber 18b is coupled to displacement absorber 20 at another end side of second heat absorber 18b in stacking direction X (a side near first battery 4a).

Coupling position P1 between first heat absorber 18a and first joint 14 is apart from coupling position P2 between first heat absorber 18a and displacement absorber 20 in a direction intersecting stacking direction X as viewed from horizontal direction Y, that is, in a direction approaching to and separating from sealing plates 8 of batteries 4. Similarly, coupling position P1 between second heat absorber 18b and second joint 16 is apart from coupling position P2 between second heat absorber 18b and displacement absorber 20 in the direction intersecting stacking direction X as viewed from horizontal direction Y. In the present exemplary embodiment, coupling position P2 is farther away from batteries 4 than coupling position P1.

That is, as viewed from horizontal direction Y, displacement absorber 20 is coupled to a corner of first heat absorber 18a, the corner being an upper side of first heat absorber 18a and near second battery 4b. First joint 14 is coupled to a corner of first heat absorber 18a, the corner being a lower side of first heat absorber 18a and near first battery 4a. Further, displacement absorber 20 is coupled to a corner of second heat absorber 18b, the corner being an upper side of second heat absorber 18b and near first battery 4a. Second joint 16 is coupled to a corner of second heat absorber 18b, the corner being a lower side of second heat absorber 18b and near second battery 4b.

At least a part of displacement absorber 20 overlaps heat absorber 18 as viewed from stacking direction X of first battery 4a and second battery 4b. Specifically, one of first parts 20a is coupled to an upper section of first heat absorber 18a at an end of first part 20a, the end being distant from batteries 4. The one of first parts 20a is coupled to second part 20b at an end of first part 20a, the end being close to batteries 4. Similarly, the other of first parts 20a is coupled to an upper section of second heat absorber 18b at an end of first part 20a, the end being distant from batteries 4. The other of first parts 20a is coupled to second part 20b at an end of first part 20a, the end being close to batteries 4. Accordingly, at least a part of displacement absorber 20 exists within a region in vertical direction Z in which heat absorber 18 extends.

In the present exemplary embodiment, a lower end of second part 20b is located above a lower end of heat absorber 18. Therefore, whole displacement absorber 20 overlaps heat absorber 18 as viewed from stacking direction X. Displacement absorber 20 is thus separated from sealing plates 8 of batteries 4. That is, displacement absorber 20 has no contact with battery 4 at least in an undeformed state. This can improve degree of deformation freedom of displacement absorber 20.

As described above, bus bar 2 according to the present exemplary embodiment includes first joint 14 that is joined to output terminal 10 of first battery 4a, second joint 16 that is joined to output terminal 10 of second battery 4b, heat absorber 18 that is disposed between first joint 14 and second joint 16, and displacement absorber 20 that is disposed between first joint 14 and second joint 16.

Heat absorber 18 has a heat capacity larger than heat capacities of first joint 14 and second joint 16. Therefore, heat generated by a current flow in bus bar 2 accumulates mainly in heat absorber 18. Heat absorber 18 can thus inhibit heat generated in bus bar 2 from transferring to battery 4.

This results in inhibition of deterioration in power generation performance caused by temperature rise of battery 4 due to the heat from bus bar 2. Additionally, this results in inhibition of deterioration in airtightness between the opening of sealing plate 8 and output terminal 10 caused by melting of gasket 11 that is relatively heat-labile. Displacement absorber 20 deforms in response to a relative displacement of first battery 4a and second battery 4b. Displacement absorber 20 can thus absorb the displacement. This can reduce possibility of breakage of bus bar 2.

Accordingly, bus bar 2 of the present exemplary embodiment can maintain a stable electrical connection between batteries 4 and inhibit deterioration in power generation performance of battery 4. Such bus bar 2, when provided to battery stack 1, can improve performance of battery stack 1.

Heat absorber 18 has a thick part that is thicker than thicknesses of first joint 14 and second joint 16. This thick part can increase the heat capacity of heat absorber 18 with simple structure. Further, at least a part of displacement absorber 20 extends in a direction intersecting stacking direction X. Consequently, displacement absorber 20 can more surely absorb a displacement in stacking direction X out of a relative displacement of adjacent batteries 4. Displacement absorber 20 is disposed such that at least a part of displacement absorber 20 overlaps heat absorber 18 as viewed from stacking direction X. That is, a space in which bus bar 2 extends has been expanded by providing heat absorber 18 and is then utilized for disposing displacement absorber 20. This can inhibit enlargement of bus bar 2 caused by providing heat absorber 18 and displacement absorber 20.

Heat absorber 18 includes first heat absorber 18a and second heat absorber 18b. Then, first heat absorber 18a is coupled to first joint 14 at one end side of first heat absorber 18a in stacking direction X, and is coupled to displacement absorber 20 at another end side of first heat absorber 18a. Second heat absorber 18b is coupled to second joint 16 at one end side of second heat absorber 18b in stacking direction X, and is coupled to displacement absorber 20 at another end side of second heat absorber 18b. That is, displacement absorber 20 is disposed between first heat absorber 18a and second heat absorber 18b. Preferably in terms of electric resistance due to thickness, displacement absorber 20 is smaller in thickness than other parts of bus bar 2. Thus, bus bar 2 is likely to generate heat especially in displacement absorber 20. Meanwhile, displacement absorber 20 is sandwiched between first heat absorber 18a and second heat absorber 18b, which can more surely inhibit temperature rise of batteries 4 due to heat generation of bus bar 2.

First heat absorber 18a connects to output terminal 10 via first joint 14, and second heat absorber 18b connects to output terminal 10 via second joint 16. Coupling position P1 between first heat absorber 18a and first joint 14 is located at a lower end of first heat absorber 18a. Similarly, coupling position P1 between second heat absorber 18b and second joint 16 is located at a lower end of second heat absorber 18b. Accordingly, first heat absorber 18a and second heat absorber 18b are separated from sealing plates 8 of batteries 4. This separation can inhibit heat that accumulates in first heat absorber 18a and second heat absorber 18b from transferring to batteries 4. This separation can also enhance efficiency of heat radiation from first heat absorber 18a and second heat absorber 18b into the air.

Coupling position P1 between first heat absorber 18a and first joint 14 is apart in a direction intersecting stacking direction X from coupling position P2 between first heat absorber 18a and displacement absorber 20. Coupling position P1 between second heat absorber 18b and second joint 16 is apart in the direction intersecting stacking direction X from coupling position P2 between second heat absorber 18b and displacement absorber 20. As a result, a displacement amount of battery 4 that can be absorbed by displacement absorber 20 increases compared to the case where coupling position P1 and coupling position P2 are disposed on the same plane. This can more surely maintain a stable electrical connection between batteries 4.

The present invention is not limited to the above-described exemplary embodiment. Modifications, such as various design changes, can be added to the exemplary embodiment based on knowledge of the person of ordinary skill in the art. The modified exemplary embodiment also falls within the scope of the present invention. A new exemplary embodiment obtained by adding modifications to the above-described exemplary embodiment has respective effects of the combined exemplary embodiment and modifications.

Hereinafter, modified examples of bus bar 2 according to the present exemplary embodiment will be described. In description of each modified example, features different from the exemplary embodiment will be mainly described. Description of configuration common to the exemplary embodiment will be briefly made or omitted.

Modified Example 1

Figure 5A:
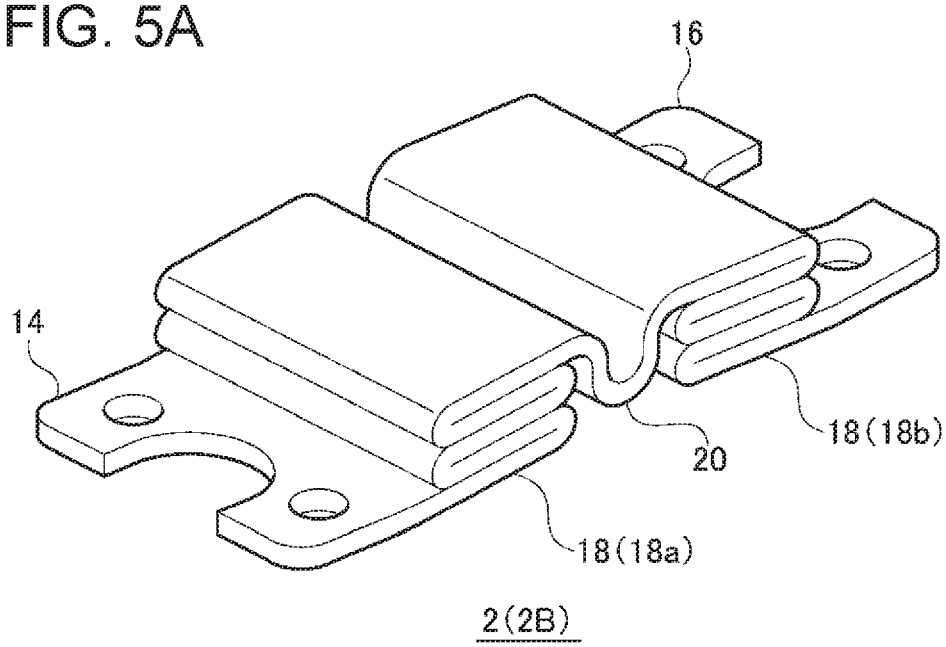
FIG. 5A is a perspective view illustrating a schematic structure of a bus bar according to modified example 1.

FIG. 5A is a perspective view illustrating a schematic structure of a bus bar according to modified example 1. Bus bar 2 (2B) according to the present modified example has a different structure of heat absorber 18 from that in the exemplary embodiment. Specifically, heat absorber 18 has a zigzag shape formed by folding a metal sheet. Contact among the folded parts forms a thick part.

Bus bar 2 of the present modified example can be produced by bending one metal sheet. That is, one end side of one metal sheet serves as first joint 14 and the other end side of the metal sheet serves as second joint 16. A part adjacent to first joint 14 is zigzag folded to form first heat absorber 18a. A part adjacent to second joint 16 is zigzag folded to form second heat absorber 18b. A part between first heat absorber 18a and second heat absorber 18b is bent in a U-shape to form displacement absorber 20. Above-described process yields bus bar 2. According to the present modified example, bus bar 2 can be produced more easily than bus bar 2 configured with one member containing a thick part and a thin part.

Modified Example 2

Figure 5B:
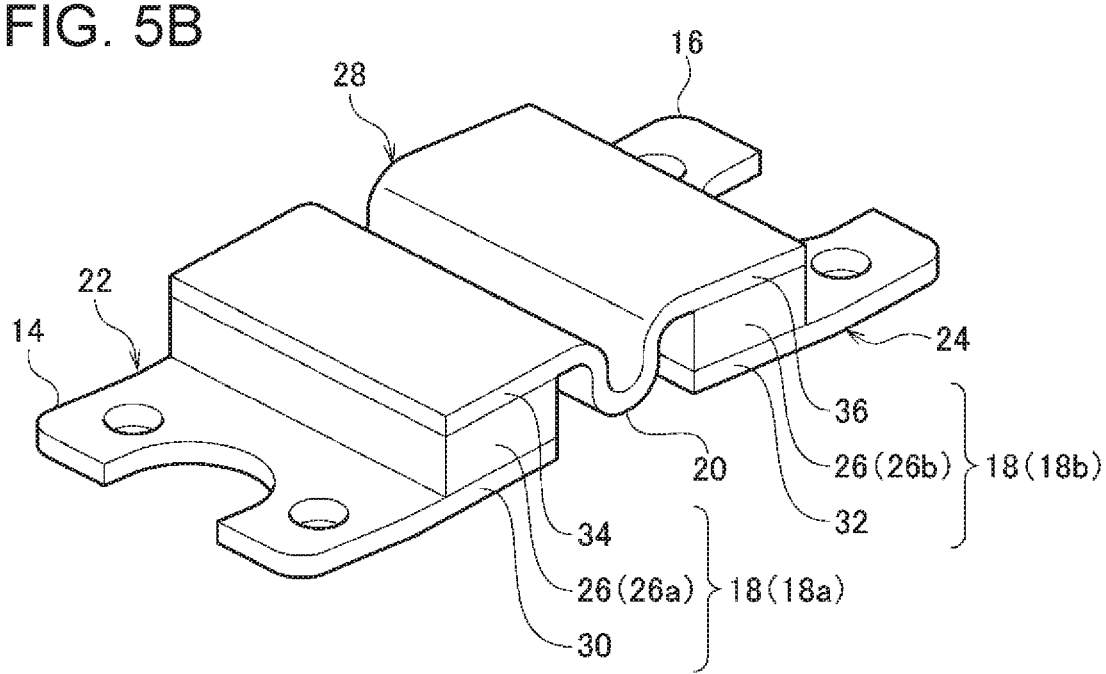
FIG. 5B is a perspective view illustrating a schematic structure of a bus bar according to modified example 2.

FIG. 5B is a perspective view illustrating a schematic structure of a bus bar according to modified example 2. Bus bar 2 (2C) according to the present modified example has a different structure in which a plurality of members is joined together from the one in the exemplary embodiment. Specifically, bus bar 2 is formed by joining first member 22 constituting first joint 14, second member 24 constituting second joint 16, third member 26 constituting heat absorber 18, and fourth member 28 constituting displacement absorber 20.

For example, first member 22 is plate-shaped and includes first joint 14 at one end side of first member 22, and joint 30 at the other end side of first member 22. Similarly, second member 24 is plate-shaped and includes second joint 16 at one end side of second member 24, and joint 32 at the other end side of second member 24. Third member 26 is rectangular-parallelepiped-shaped and as a whole constitutes a part of heat absorber 18. In the present modified example, two third members 26a, 26b are used. Fourth member 28 includes displacement absorber 20 in the middle of fourth member 28, and also includes plate-shaped joints 34, 36 at both sides of displacement absorber 20.

First member 22, one of third members 26a, and fourth member 28 are disposed such that third member 26a is sandwiched between joint 30 of first member 22 and joint 34 of fourth member 28, and joined together. Joint 30, third member 26a, and joint 34 constitute first heat absorber 18a. Second member 24, the other of third members 26b and fourth member 28 are disposed such that third member 26b is sandwiched between joint 32 of second member 24 and joint 36 of fourth member 28, and joined together. Joint 32, third member 26b, and joint 36 constitute second heat absorber 18b. Above-described process yields bus bar 2. That is, bus bar 2 of the present modified example is made of clad material According to the present modified example, materials constituting first joint 14, second joint 16, heat absorber 18, and displacement absorber 20 can easily be changed. Therefore, each part can be configured with an optimal material for a role of the part. For example, aluminum is selected as a material for one of first joint 14 and second joint 16, the one being joined to positive-electrode terminal 10a. Copper is selected as a material for one of first joint 14 and second joint 16, the one being joined to negative-electrode terminal 10b. Aluminum or copper is selected as a material for displacement absorber 20. A material having a specific heat capacity larger than specific heat capacities of aluminum and copper can be selected for third member 26.

According to the present modified example, each member that constitutes bus bar 2 can be even in thickness. Therefore, bus bar 2 can be produced more easily than bus bar 2 configured with one member containing a thick part and a thin part.

Modified Example 3

Figure 6A:
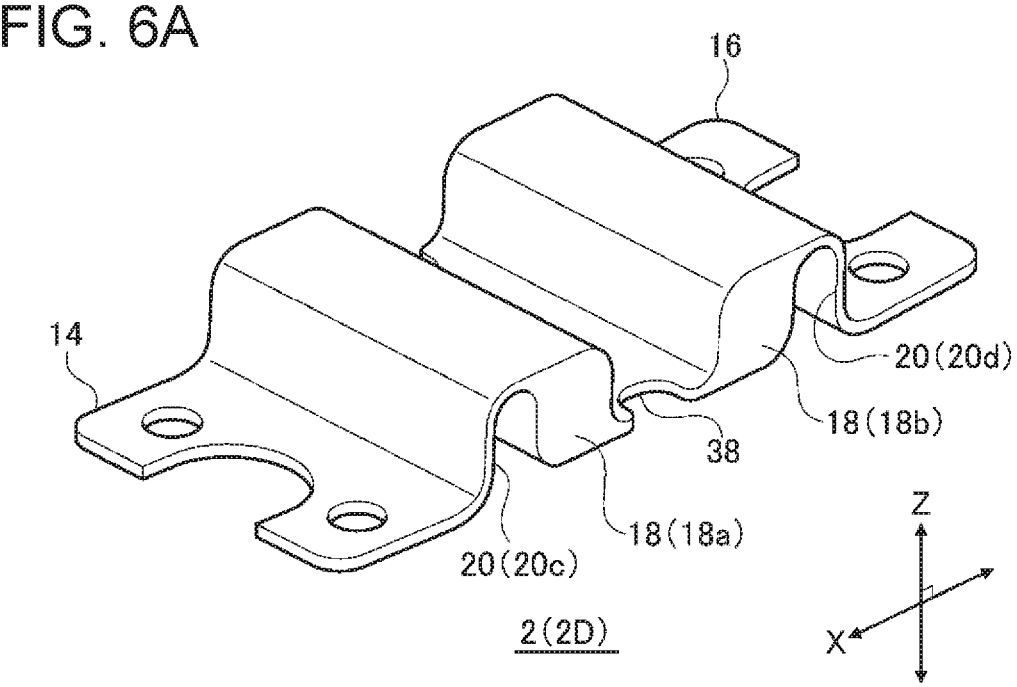
FIG. 6A is a perspective view illustrating a schematic structure of a bus bar according to modified example 3.

FIG. 6A is a perspective view illustrating a schematic structure of a bus bar according to modified example 3. Bus bar 2 (2D) according to the present modified example has a different structure of having two displacement absorbers 20 and of an array of parts from the one in the exemplary embodiment. Specifically, bus bar 2 has first joint 14, second joint 16, first heat absorber 18a, second heat absorber 18b, first displacement absorber 20c, and second displacement absorber 20d.

First displacement absorber 20c and second displacement absorber 20d extend in a direction intersecting stacking direction X as viewed from horizontal direction Y. First displacement absorber 20c is coupled to first joint 14 at a lower end of first displacement absorber 20c, and is coupled to first heat absorber 18a at an upper end of first displacement absorber 20c. Second displacement absorber 20d is coupled to second joint 16 at a lower end of second displacement absorber 20d, and is coupled to second heat absorber 18b at an upper end of second displacement absorber 20d. First heat absorber 18a and second heat absorber 18b are joined together via joint 38 that is smaller in thickness than first heat absorber 18a and second heat absorber 18b. Accordingly, in stacking direction X, first joint 14, first displacement absorber 20c, first heat absorber 18a, joint 38, second heat absorber 18b, second displacement absorber 20d, and second join 16 align in this order.

Modified Example 4

Figure 6B:
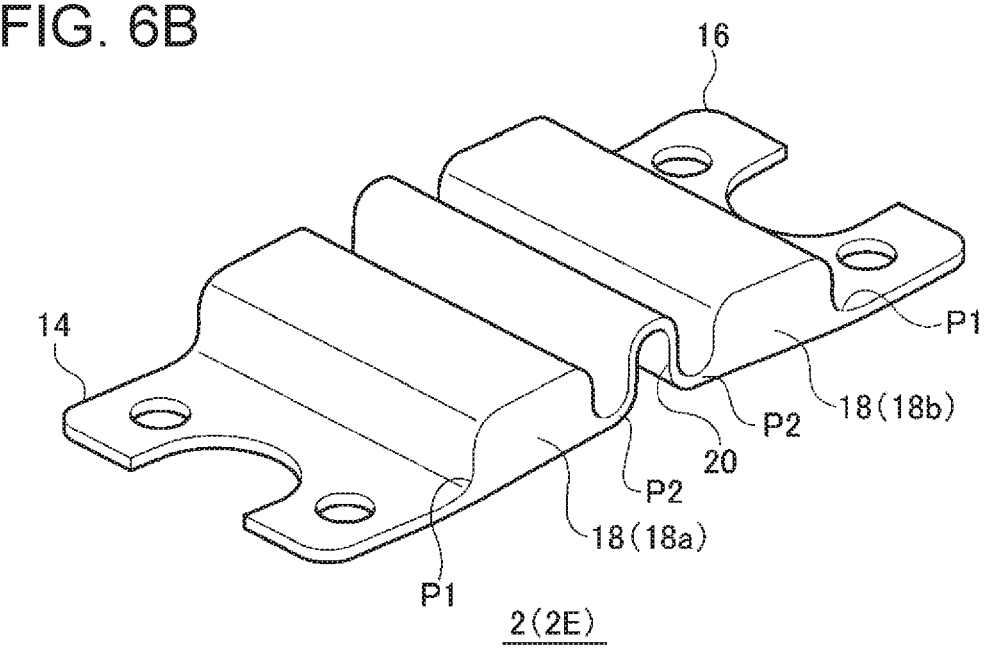
FIG. 6B is a perspective view illustrating a schematic structure of a bus bar according to modified example 4.

FIG. 6B is a perspective view illustrating a schematic structure of a bus bar according to modified example 4. Bus bar 2 (2E) according to the present modified example has a different positional relationship between coupling position P1 and coupling position P2 from one in the exemplary embodiment in. Specifically, displacement absorber 20 is inverted-U-shaped. Displacement absorber 20 is coupled to a corner of first heat absorber 18a, the corner being a lower side of first heat absorber 18a and near second heat absorber 18b. First joint 14 is coupled to a corner of first heat absorber 18a, the corner being a lower side of first heat absorber 18a and distant from second heat absorber 18b. Displacement absorber 20 is coupled to a corner of second heat absorber 18b, the corner being a lower side of second heat absorber 18b and near first heat absorber 18a. Second joint 16 is coupled to a corner of second heat absorber 18b, the corner being a lower side of second heat absorber 18b and distant from first heat absorber 18a.

Accordingly, coupling position P1 between first heat absorber 18a and first joint 14 substantially coincides in stacking direction X with coupling position P2 between first heat absorber 18a and displacement absorber 20. Similarly, coupling position P1 between second heat absorber 18b and second joint 16 substantially coincides in stacking direction X with coupling position P2 between second heat absorber 18b and displacement absorber 20.

Modified Example 5

Figure 7A:
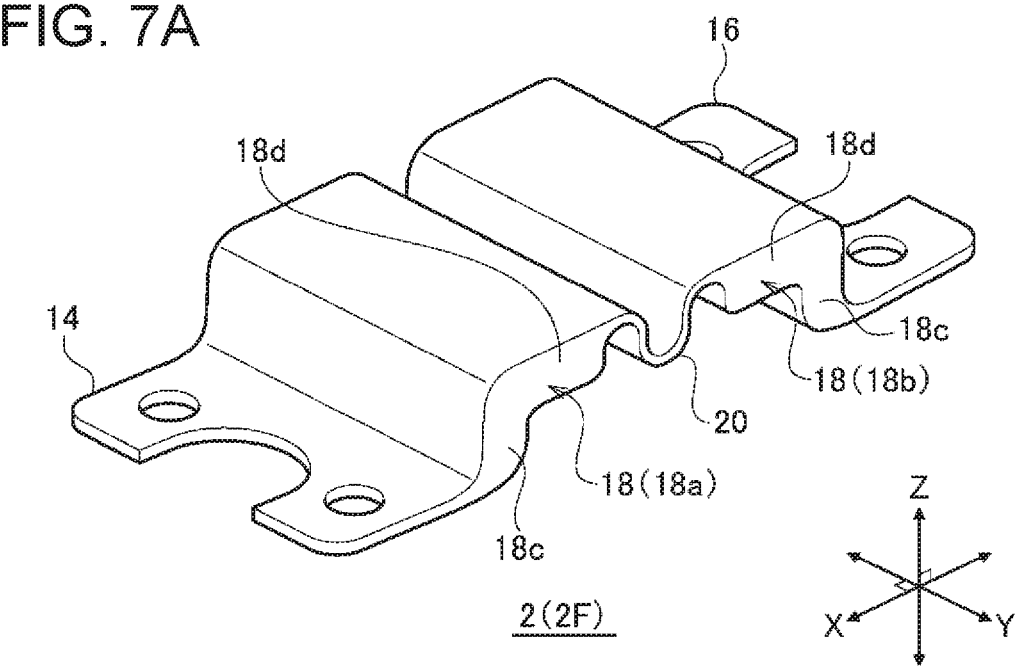
FIG. 7A is a perspective view illustrating a schematic structure of a bus bar according to modified example 5.

FIG. 7A is a perspective view illustrating a schematic structure of a bus bar according to modified example 5. Bus bar 2 (2F) according to the present modified example has a different shape of heat absorber 18 from one in the exemplary embodiment. Specifically, as viewed from horizontal direction Y, first heat absorber 18a and second heat absorber 18b include first part 18c extending in a direction intersecting stacking direction X, and second part 18d extending in stacking direction X. One end of second part 18d is coupled to an upper end of first part 18c. The other end of second part 18d is coupled to displacement absorber 20. A lower end of first part 18c is coupled to first joint 14 or second joint 16. According to the present modified example, a part of heat absorber 18, that is, second part 18d can be farther separated from batteries 4. This separation can further enhance heat radiation efficiency of heat absorber 18.

Modified Example 6

Figure 7B:
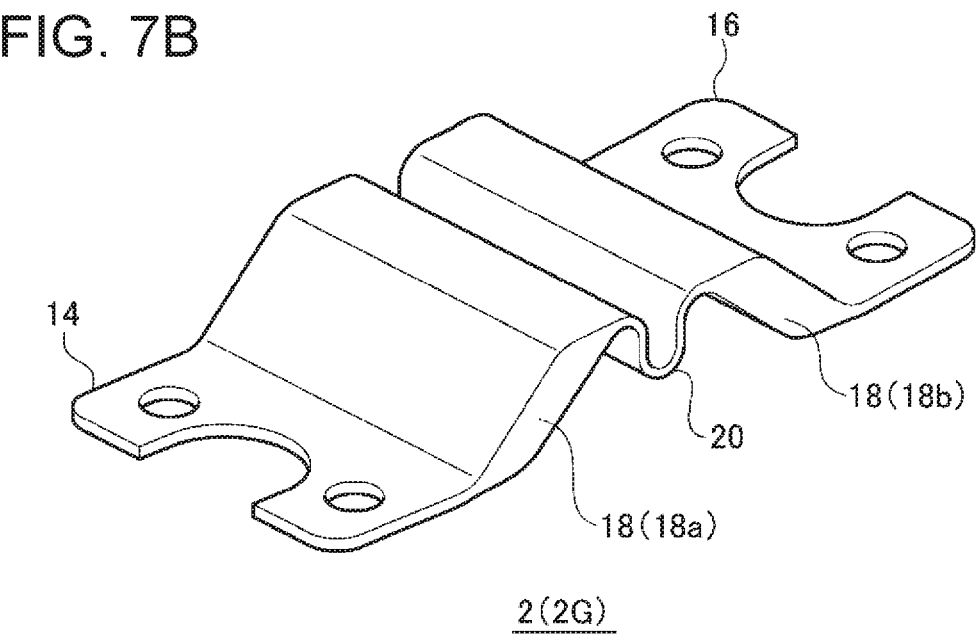
FIG. 7B is a perspective view illustrating a schematic structure of a bus bar according to modified example 6.

FIG. 7B is a perspective view illustrating a schematic structure of a bus bar according to modified example 6. Bus bar 2 (2G) according to the present modified example has a different shape of heat absorber 18 from one in the exemplary embodiment. Specifically, first heat absorber 18a and second heat absorber 18b are slope-shaped and gradually rise toward each other. According to the present modified example, at least a part of heat absorber 18 can be farther separated from batteries 4. This separation can further enhance heat radiation efficiency of heat absorber 18.

Modified Example 7

Figure 8A:
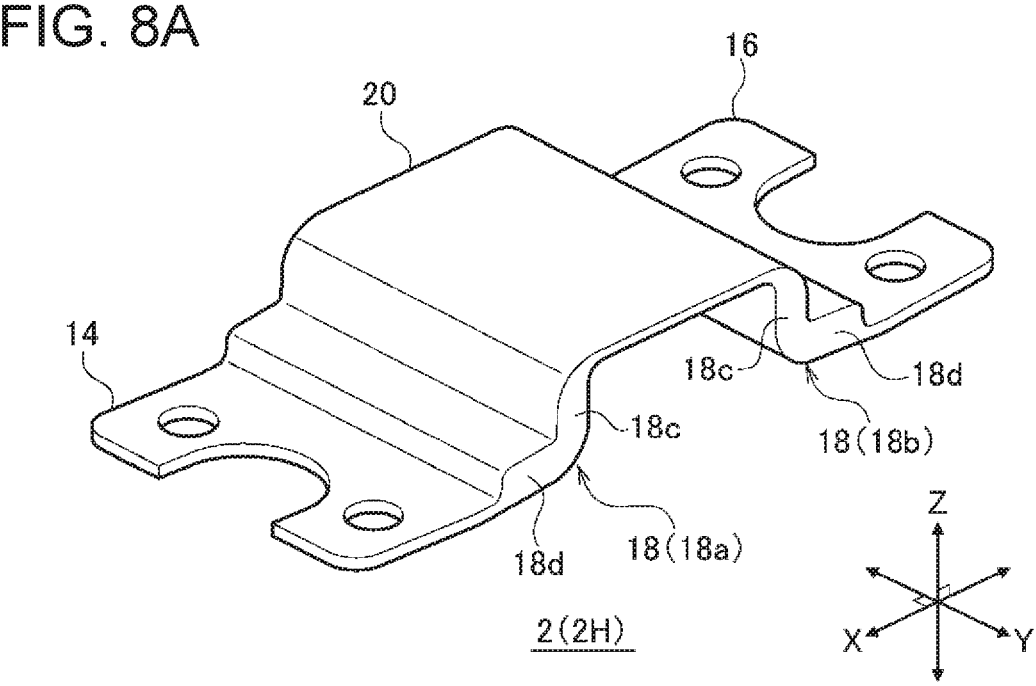
FIG. 8A is a perspective view illustrating a schematic structure of a bus bar according to modified example 7.
Figure 8B:
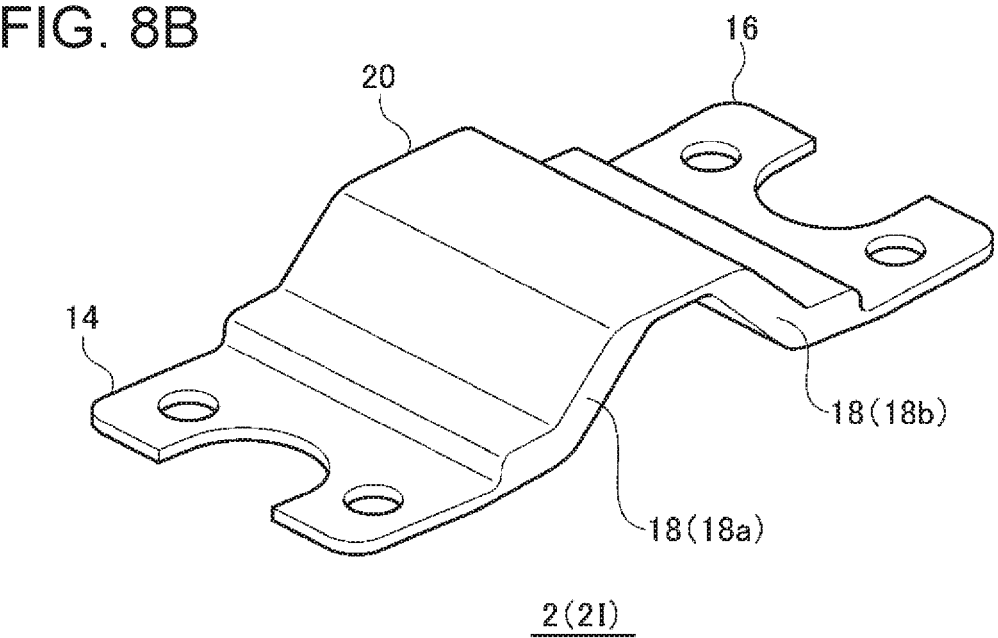
FIG. 8B is a perspective view illustrating a schematic structure of a bus bar according to modified example 8.

FIG. 8A is a perspective view illustrating a schematic structure of a bus bar according to modified example 7. Bus bar 2 (2H) according to the present modified example has different shapes of heat absorber 18 and displacement absorber 20 from those in the exemplary embodiment. Specifically, as viewed from horizontal direction Y, first heat absorber 18a and second heat absorber 18b include first part 18c extending in a direction intersecting stacking direction X, and second part 18d extending in stacking direction X. A lower end of first part 18c is coupled to one end of second part 18d. An upper end of first part 18c is coupled to displacement absorber 20. The other end of second part 18d is coupled to first joint 14 or second joint 16. Displacement absorber 20 is plate-shaped and smaller in thickness than heat absorber 18.

Modified Example 8

FIG. 8A is a perspective view illustrating a schematic structure of a bus bar according to modified example 8. Bus bar 2 (2I) according to the present modified example has different shapes of heat absorber 18 and displacement absorber 20 from those in the exemplary embodiment. Specifically, at least a part of first heat absorber 18a and least a part of second heat absorber 18b are slope-shaped and gradually rise toward each other. Displacement absorber 20 is plate-shaped and smaller in thickness than heat absorber 18.

Other Modified Examples

In the exemplary embodiment described above, battery 4 is a prismatic battery. However, a shape of battery 4 is not particularly limited and may be cylindrical, for example. A number of batteries 4 included in battery stack 1 is also not particularly limited. Moreover, exterior can 6 may be covered with an insulating sheet, such as a shrink tube.

The invention claimed is:

1. A bus bar comprising:
a first joint that is joined to an output terminal of a first battery;
a second joint that is joined to an output terminal of a second battery adjacent to the first battery;
a displacement absorber that is disposed between the first joint and the second joint and deforms in response to a relative displacement of the first battery and the second battery;
a first heat absorber that is disposed between the first joint and the displacement absorber; and
a second heat absorber that is disposed between the second joint and the displacement absorber, wherein:
the first and second heat absorbers have a heat capacity larger than heat capacities of the first joint and the second joint,
each of the first heat absorber and the second heat absorber has a thick part that is thicker than thicknesses of the first joint and the second joint and a thickness of the displacement absorber,
the displacement absorber has a U-shape that has a convex portion convex toward a battery side along a vertical direction and a first top portion and a second top portion,
the first top portion is connected at a first connection point to a top portion of the thick part of the first heat absorber, and a bottom portion of the thick part the first heat absorber is connected to the first joint at a second connection point,
the second top portion is connected at a third connection point to a top portion of the thick part of the second heat absorber, and a bottom portion of the thick part of the second heat absorber is connected to the second joint at a fourth connection point, and
the first connection point is displaced from the second connection point in the vertical direction as viewed from the stacking direction of the first battery and the second battery, and
the third connection point is displaced from the fourth connection point in the vertical direction as viewed from the stacking direction of the first battery and the second battery.

2. The bus bar according to claim 1, wherein at least a part of the displacement absorber extends in a direction intersecting a stacking direction of the first battery and the second battery.

3. The bus bar according to claim 2, wherein an apex of the convex portion of the U-shape of the displacement absorber overlaps the first heat absorber and the second heat absorber as viewed from the stacking direction of the first battery and the second battery.

4. The bus bar according to claim 1, wherein:
the first heat absorber is coupled to the first joint at one end side of the first heat absorber in a stacking direction of the first battery and the second battery, and is coupled to the displacement absorber at another end side of the first heat absorber in the stacking direction,
the second heat absorber is coupled to the second joint at one end side of the second heat absorber in the stacking direction, and is coupled to the displacement absorber at another end side of the second heat absorber in the stacking direction, and
a coupling position between the first heat absorber and the first joint is apart in a direction intersecting the stacking direction from a coupling position between the first heat absorber and the displacement absorber, and a coupling position between the second heat absorber and the second joint is apart in the direction intersecting the stacking direction from a coupling position between the second heat absorber and the displacement absorber.

5. The bus bar according to claim 1,
wherein the bus bar is formed by joining a first member constituting the first joint, a second member constituting the second joint, a third member constituting the first heat absorber, and a fourth member constituting the second heat absorber and the fifth member constituting the displacement absorber.

6. A battery stack comprising:
a first bus bar and a second bus bar, each of which is the bus bar according to claim 1; and
a plurality of batteries including a first battery, a second battery and a third battery stacked along the stacking direction,
wherein the first battery and second battery are connected by the first bus bar, and the second battery and the third battery are connected by the second bus bar.

7. The bus bar according to claim 4, wherein the bus bar is formed by joining a first member constituting the first joint, a second member constituting the second joint, a third member constituting the first heat absorber, and a fourth member constituting the second heat absorber and the fifth member constituting the displacement absorber.

8. A battery stack comprising:
a first bus bar and a second bus bar, each of which is the bus bar according to claim 6; and
a plurality of batteries including a first battery, a second battery and a third battery stacked along the stacking direction, wherein the first battery and second battery are connected by the first bus bar, and the second battery and the third battery are connected by the second bus bar.

9. A battery stack comprising:
a first bus bar and a second bus bar, each of which is the bus bar according to claim 7; and
a plurality of batteries including a first battery, a second battery and a third battery stacked along the stacking direction,
wherein the first battery and second battery are connected by the first bus bar, and the second battery and the third battery are connected by the second bus bar.

10. A bus bar comprising:
a first joint that is joined to an output terminal of a first battery;
a second joint that is joined to an output terminal of a second battery adjacent to the first battery;
a displacement absorber that is disposed between the first joint and the second joint and deforms in response to a relative displacement of the first battery and the second battery;
a first heat absorber that is disposed between the first joint and the displacement absorber; and
a second heat absorber that is disposed between the second joint and the displacement absorber, wherein:
the first and second heat absorber have a heat capacity larger than heat capacities of the first joint and the second joint,
the displacement absorber has a U-shape that has a convex portion convex away from a battery side along a vertical direction and has a first bottom and a second bottom sandwiching the convex portion,
the first and second heat absorber have a thickness measured along the vertical direction greater than a thickness of each of the first joint measured along the vertical direction and the second joint and a thickness of the displacement absorber measured along the vertical direction,
the first heat absorber is coupled to the first joint at one end side of the first heat absorber in a stacking direction of the first battery and the second battery, and is coupled to the first bottom of the U-shape of the displacement absorber at another end side of the first heat absorber in the stacking direction,
the second heat absorber is coupled to the second joint at one end side of the second heat absorber in the stacking direction, and is coupled to the second bottom of the U-shape of the displacement absorber at another end side of the second heat absorber in the stacking direction, and
a coupling position between the first heat absorber and the first joint is a same in the vertical direction as a coupling position between the first heat absorber and the displacement absorber, and a coupling position between the second heat absorber and the second joint is a same in the vertical direction as a coupling position between the second heat absorber and the displacement absorber.

* * * * *